United States Patent
Yutani

(10) Patent No.: US 7,672,597 B2
(45) Date of Patent: Mar. 2, 2010

(54) OPTICAL TRANSMITTER WITH EXTERNAL MODULATOR, OPTICAL TRANSCEIVER INCLUDING OPTICAL TRANSMITTER WITH EXTERNAL MODULATOR, AND METHODS OF DRIVING THE SAME

(75) Inventor: Katsuhiro Yutani, Tokyo (JP)

(73) Assignee: NEC Corporation, Tokyo (JP)

( * ) Notice: Subject to any disclaimer, the term of this patent is extended or adjusted under 35 U.S.C. 154(b) by 514 days.

(21) Appl. No.: 11/727,092

(22) Filed: Mar. 23, 2007

(65) Prior Publication Data

US 2007/0230969 A1   Oct. 4, 2007

(30) Foreign Application Priority Data

Mar. 28, 2006  (JP) ............................. 2006-089386

(51) Int. Cl.
*H04B 10/04* (2006.01)
(52) U.S. Cl. .................. 398/183; 398/197; 398/198; 372/26; 372/29.015; 372/38.02
(58) Field of Classification Search ............... 398/183, 398/182, 197, 198; 372/26, 29.014, 29.015, 372/29.021, 38.02, 38.07
See application file for complete search history.

(56) References Cited

U.S. PATENT DOCUMENTS

| 5,481,559 | A | * | 1/1996 | Kawamura | ................. 372/50.1 |
| 5,706,117 | A | * | 1/1998 | Imai et al. | ................... 398/197 |
| 5,917,637 | A | | 6/1999 | Ishikawa et al. | |
| 7,194,012 | B2 | * | 3/2007 | Mason et al. | ............ 372/38.02 |
| 2003/0185257 | A1 | * | 10/2003 | Suzuki et al. | ................. 372/26 |
| 2005/0232319 | A1 | | 10/2005 | Mason et al. | |

FOREIGN PATENT DOCUMENTS

| EP | 0 911 997 A2 | 4/1999 |
| JP | 9-179079 | 7/1997 |

* cited by examiner

*Primary Examiner*—M. R. Sedighian
(74) *Attorney, Agent, or Firm*—Foley & Lardner LLP

(57) ABSTRACT

An optical transmitter with an external modulator includes a light-emitting unit emitting a continuous wave light, a modulation unit modulating the continuous wave light in accordance with an electric signal, a first terminal applying a first positive voltage to a cathode of the light-emitting unit and a cathode of the modulation unit, a second terminal applying a second positive voltage of a constant value to an anode of the light-emitting unit, and a third terminal applying a third positive voltage with the electric signal to an anode of the modulation unit. The second positive voltage is set to a value higher than the first positive voltage, and the third positive voltage is set to a value lower than the first positive voltage.

15 Claims, 5 Drawing Sheets

OPTICAL TRANSMITTER WITH EXTERNAL MODULATOR, OPTICAL TRANSCEIVER INCLUDING OPTICAL TRANSMITTER WITH EXTERNAL MODULATOR, AND METHODS OF DRIVING THE SAME

BACKGROUND OF THE INVENTION

1. Field of the Invention

The present invention relates to an optical transmitter with an external modulator, an optical transceiver including the optical transmitter with the external modulator, and methods of driving the same, and more particularly, to an optical transmitter with an electro-absorption optical modulator serving as an external modulator, an optical transceiver including the optical transmitter with the electro-absorption optical modulator, and methods of driving the same.

2. Description of the Related Art

In optical communications, an optical transceiver is a key device serving as an interface between an electric signal and an optical signal. The optical transceiver includes an optical transmitter performing electrical-optical conversion and an optical receiver performing optical-electrical conversion. In order to drive and control the optical transmitter and the optical receiver, the optical transceiver generally further includes a microcomputer, a driver circuit, a power supply circuit, and a temperature adjusting circuit.

In recent years, it has been requested that a transmission distance and a communication capacity are increased with the rapid expansion of fields to which optical communications are applied. Therefore, in order to satisfy the requirements of chromatic dispersion and spectral accuracy on long-haul transmission, dense wavelength division multiplexing (DWDM) transmission, or the like, an external modulating method is used for many structures of the optical transmitter installed in the optical transceiver. An electro-absorption optical modulator (EAM) which is easily integrally formed with a semiconductor laser has been known as one of means for realizing the external modulating method. An optical transmitter including the EAM is disclosed in Japanese Patent Application Laid-open No. Hei 09-179079 (patent family U.S. Pat. No. 5,917,637). A modulator integrated laser diode (MI-LD) serving as the optical transmitter includes a laser diode (LD) having an active layer emitting light and an EAM having an absorption layer absorbing the light to modulate the light. The LD and the EAM are integrally formed with each other. In the MI-LD, the active layer of the LD is directly connected with the absorption layer of the EAM, so the light emitted from the active layer of the LD is efficiently introduced into the absorption layer of the EAM. Thus, the MI-LD has an advantage in that a high-efficiency optical transmitter with an external modulator is obtained. The MI-LD can be formed using a single semiconductor chip, so the MI-LD has an advantage in that a reduction in size can be achieved by integration.

However, in order to drive the MI-LD described in Japanese Patent Application Laid-open No. Hei 09-179079, it is necessary to apply a forward bias voltage to LD side and to apply a backward bias voltage to the EAM side. That is, it is necessary to apply a positive applied voltage to an LD side electrode relative to a grounded common electrode for the LD and the EAM and to apply a negative applied voltage to an EAM side electrode relative thereto. Therefore, in order to drive the MI-LD, two different power supplies, namely, positive and negative power supplies are required. Furthermore, the use of the negative voltage power supply may cause generation of power supply noise and deterioration in characteristic of the optical transceiver which are caused by the negative voltage power supply. It is necessary to draw power supply wirings for the negative voltage power supply and to use parts for the negative voltage power supply. Thus, the MI-LD has a fear of reducing the general versatility in a case where the optical transmitter is installed in an apparatus or in use environments.

SUMMARY OF THE INVENTION

In view of the foregoing and other exemplary problems, drawbacks, and disadvantages of the related art methods and structures, an exemplary feature of the present invention is to provide an optical transmitter with an external modulator in which a positive voltage is realized as a driving voltage to be set and thus the general versatility in the case where the optical transmitter is installed in an apparatus or in use environments is excellent, an optical transceiver including the optical transmitter with the external modulator, and methods of driving the same.

An optical transmitter with an external modulator according to the present invention includes a light-emitting unit emitting a continuous wave light, a modulation unit modulating the continuous wave light in accordance with an electric signal, a first terminal applying a first positive voltage to a cathode of the light-emitting unit and a cathode of the modulation unit, a second terminal applying a second positive voltage of a constant value to an anode of the light-emitting unit, and a third terminal applying a third positive voltage with the electric signal to an anode of the modulation unit. The second positive voltage is set to a value higher than the first positive voltage, and the third positive voltage is set to a value lower than the first positive voltage.

An optical transceiver according to the present invention includes the optical transmitter with the external modulator, and a positive voltage power supply applying the first positive voltage to the optical transmitter with the external modulator. The power supply applies the first positive voltage to the cathode of the light-emitting unit and the cathode of the modulation unit through the first terminal.

A method of driving an optical transmitter with an external modulator according to the present invention having a light-emitting unit and a modulation unit, includes applying a first positive voltage to a cathode of the light-emitting unit and a cathode of the modulation unit, applying a second positive voltage of a constant value to an anode of the light-emitting unit, emitting continuous wave light from the light-emitting unit, applying a third positive voltage with an electric signal to an anode of the modulation unit, and modulating the continuous wave light in accordance with the electric signal by the modulation unit. The second positive voltage is set to a value higher than the first positive voltage, and the third positive voltage is set to a value lower than the first positive voltage.

Consequently, according to the optical transmitter with the external modulator, the optical transceiver including the optical transmitter with the external modulator, and the methods of driving the same in the present invention, the positive voltage can be set as the driving voltage with the structure and the method as described above. Thus, the present invention has an effect that a negative voltage power supply is unnecessary and thereby the general versatility in the case where the optical transmitter is installed in an apparatus or in use environments is excellent.

BRIEF DESCRIPTION OF THE DRAWINGS

Exemplary aspects, features and advantages of the present invention will become more apparent from the following detailed description when taken in conjunction with the accompanying drawings wherein.

DETAILED DESCRIPTION OF THE EXEMPLARY ASPECTS

Exemplary aspects for carrying out the present invention will be described in detail hereinbelow with reference to the drawings. The exemplary aspects described below show only illustrative examples in understanding the present invention, and the claims of the invention are not limited to these exemplary aspects.

Hereinafter, preferred exemplary aspects of an optical transmitter with an external modulator, an optical transceiver including the optical transmitter with the external modulator, and methods of driving the same according to the present invention will be described in detail.

Figure 1:
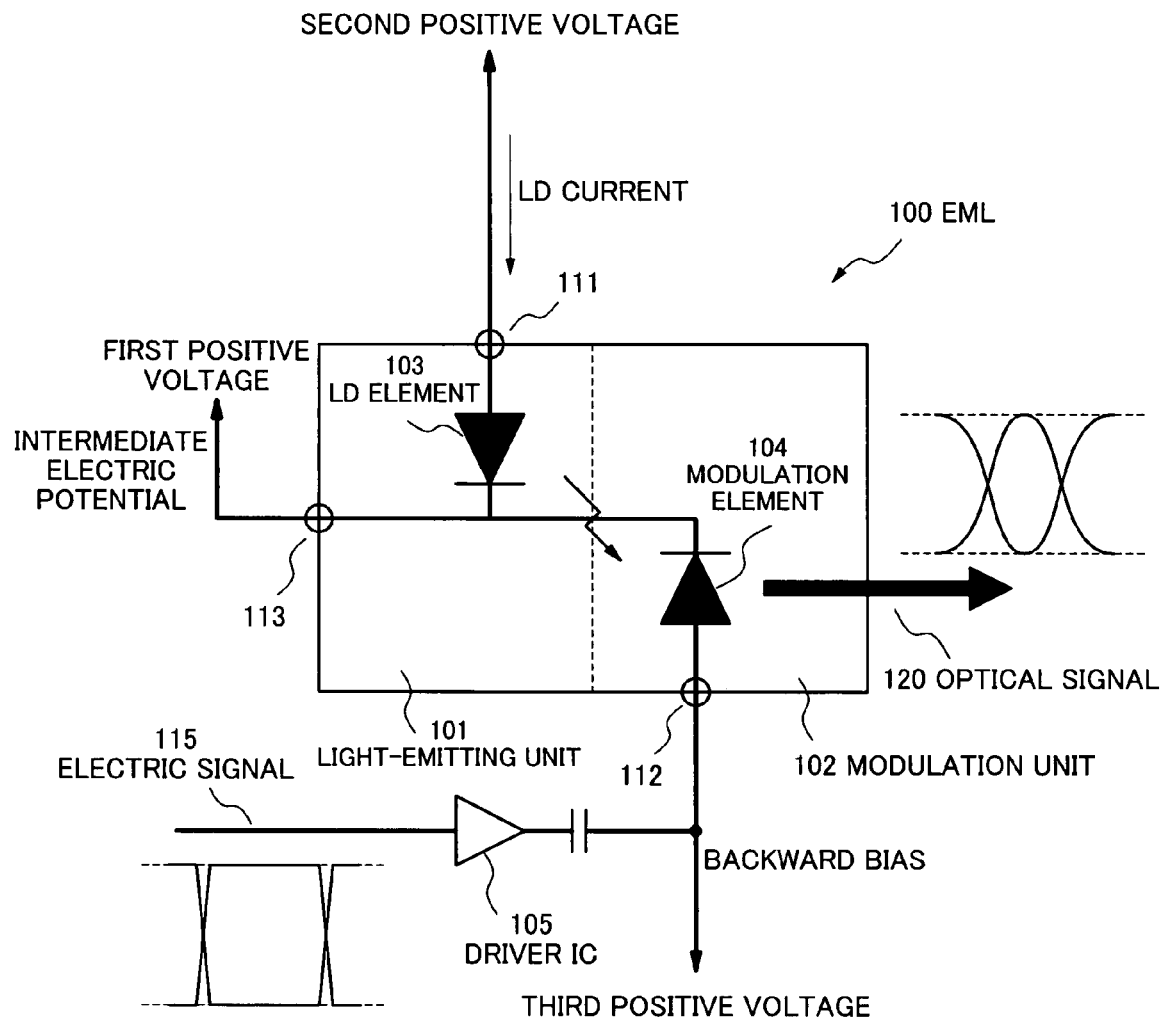
FIG. 1 is a schematic diagram illustrating an optical transmitter with an external modulator according to an exemplary aspect of the present invention.
Figure 2A:
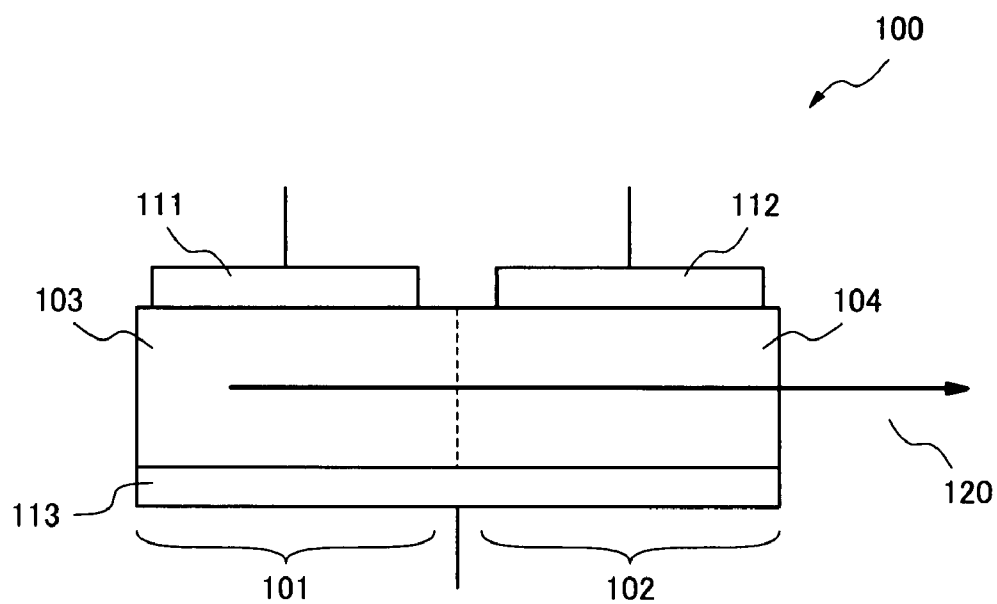
FIG. 2A is a structural diagram illustrating the optical transmitter with the external modulator according to the exemplary aspect of the present invention and FIG. 2B is another structural diagram illustrating the optical transmitter with the external modulator according to the exemplary aspect of the present invention.

First, an optical transmitter with an external modulator according to an exemplary aspect of the present invention will be described. FIG. 1 is a schematic diagram illustrating the optical transmitter with the external modulator according to the exemplary aspect of the present invention. FIG. 2A is a structural diagram illustrating the optical transmitter with the external modulator according to the exemplary aspect of the present invention. In this exemplary aspect, an electro-absorption modulated laser (EML) 100 will be described as an example of the optical transmitter with the external modulator. The EML 100 includes a light-emitting unit 101 and a modulation unit 102, which are integrated with each other. The light-emitting unit 101 includes a laser diode (LD) element 103. The modulation unit 102 includes a modulation element 104 serving as an electro-absorption optical modulator. The LD element 103 emits continuous wave (CW) light having a predetermined intensity based on an LD current. The modulation element 104 externally modulates the CW light emitted from the LD element 103 based on a backward bias to output modulation light.

Figure 2B:
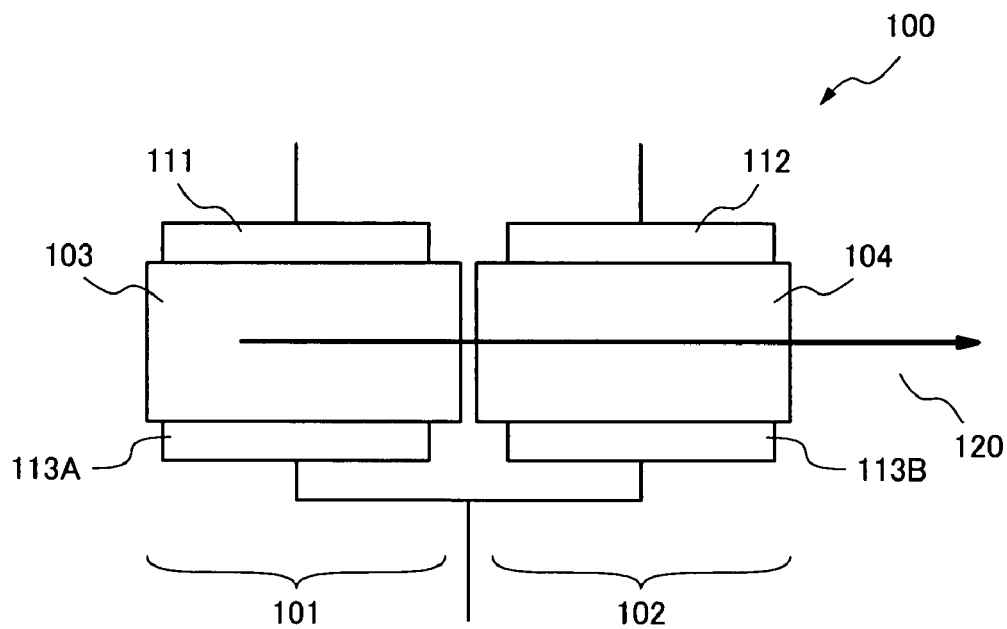

As shown in FIG. 2A, in the EML 100, the LD element 103 and the modulation element 104 are integrally formed as a semiconductor chip on the same substrate. The LD element 103 has an anode terminal 111 to which the LD current is supplied. On the other hand, the modulation element 104 has an anode terminal 112 to which the backward bias is applied. In addition, the LD element 103 and the modulation element 104 include a commonly used cathode terminal 113. An example of the LD element 103 is a distributed feedback laser diode (DFB-LD). An example of the modulation element 104 is an electro-absorption optical modulator (EAM). An active layer of the LD element 103 is directly connected with an absorption layer of the modulation element 104. Therefore, the EML 100 has an advantage in that, as shown by an arrow 120 of FIG. 2A, light emitted from the active layer of the LD element 103 is effectively introduced into the absorption layer of the modulation element 104. The EML 100 can be formed using a single semiconductor chip, thereby having an advantage in that a reduction in the number of parts, the execution of common manufacturing processes, a reduction in size resulting from integration, and the like can be realized. However, in the present invention, the structure of the EML 100 is not limited to only the above-mentioned structure. As shown in FIG. 2B, the LD element 103 and the modulation element 104 maybe formed in a hybrid structure. Furthermore, the LD element 103 and the modulation element 104, which are formed as separate devices, may be optically coupled with each other through an optical fiber or a lens system.

Next, operation of the optical transmitter with the external modulator according to the exemplary aspect of the present invention will be described in detail hereinbelow. As shown in FIG. 1, positive voltages are applied to the anode terminal 111 of the light-emitting unit 101, the anode terminal 112 of the modulation unit 102, and the common cathode terminal 113. Specifically, a first positive voltage being an intermediate electric-potential is applied to the common cathode terminal 113. A second positive voltage is applied to the anode terminal 111 of the light-emitting unit 101 in forward bias relative to the LD element 103. On the other hand, a third positive voltage is applied to the anode terminal 112 of the modulation unit 102 in backward bias relative to the modulation element 104. A driver integrated circuit (driver IC) 105 amplifies an inputted electric signal 115 and supplies the third positive voltage corresponding to the amplified electric signal to the modulation element 104 in backward bias. The values of the positive voltages are adjusted to hold a relationship expressed by the following expression (1).

Second positive voltage>first positive voltage>third positive voltage     Expression (1)

With the above adjustment, the LD current is applied to the LD element 103 in a direction from the anode terminal 111 to the cathode terminal 113 being the intermediate electric-potential. As a result, the LD element 103 emits the CW light. A modulation current is supplied to the modulation element 104 according to the inputted electric signal 115 in a direction from the cathode terminal 113 being the intermediate electric-potential to the anode terminal 112. As a result, the modulation element 104 changes optical absorptance to control the ON/OFF output of the CW light. Potential differences among the respective voltages are adjusted to values suitable to drive the LD element 103 and the modulation element 104.

The optical transmitter with the external modulator according to this exemplary aspect has the following effect. As described above, according to this exemplary aspect, the voltages for driving the EML 100 are set to positive voltages, and are adjusted so as to satisfy the expression (1). Therefore, all the voltages for driving the EML 100 can be supplied from the positive voltage power supply. Accordingly, a negative voltage power supply is unnecessary, so power supply noise generated from the negative voltage power supply can be reduced. In addition, it is unnecessary to draw power supply wirings for the negative voltage power supply and to use parts for the negative voltage power supply, which are used to be necessary. In this exemplary aspect, the power supply may be commonly used to reduce the necessary number of power supplies, with the result that the general versatility is improved. Furthermore, no circuit for the negative voltage power supply is required, so the optical transmitter with the external modulator can be driven by only the positive power supply whose versatility is high. Consequently, this exemplary aspect has an effect capable of negating the need for a negative voltage power supply and thereby improving the general versatility in the case where the optical transmitter is installed in an apparatus or in use environments.

Figure 3:
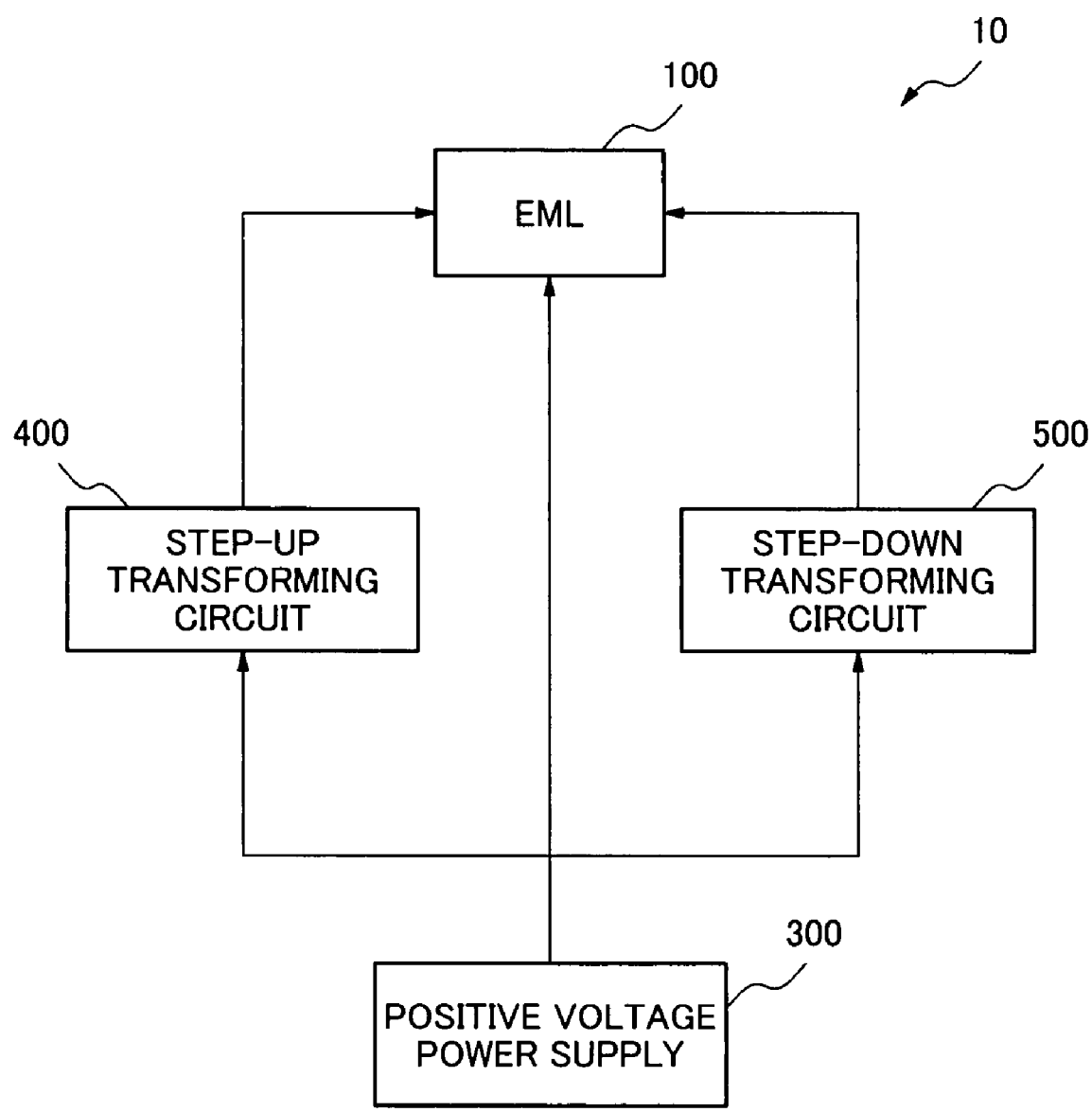
FIG. 3 is a block diagram illustrating a fundamental structure of the optical transceiver according to the present invention.
Figure 4:
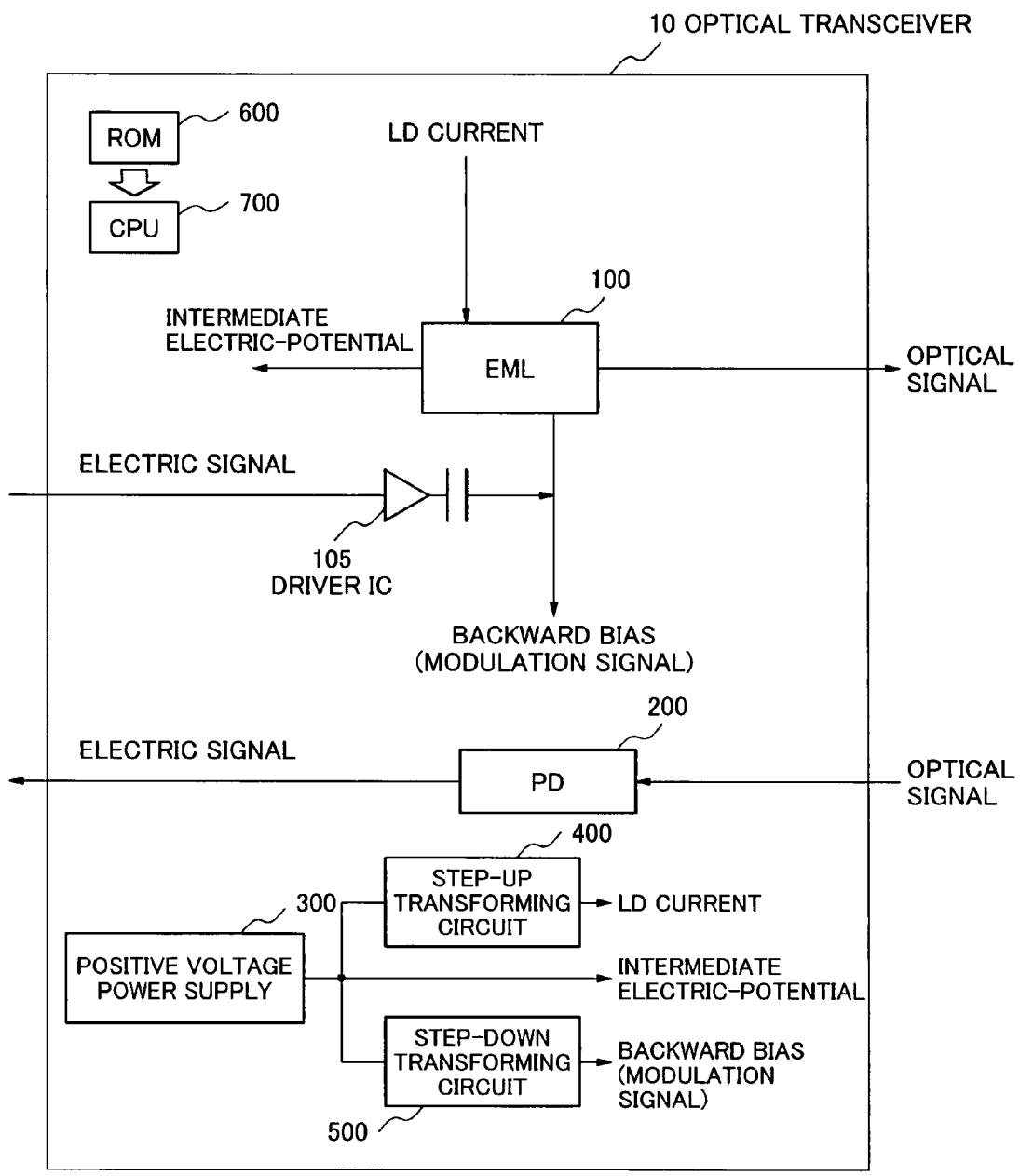
FIG. 4 is a schematic diagram illustrating an optical transceiver according to the exemplary aspect of the present invention.

Subsequently, an optical transceiver according to the exemplary aspect of the present invention will be described. FIG. 3 is a block diagram illustrating a fundamental structure of the optical transceiver according to the present invention. FIG. 4 is a schematic diagram illustrating the optical transceiver according to the exemplary aspect of the present invention. By referring to FIGS. 3 and 4, the structure of the optical transceiver according to the exemplary aspect of the present invention will be described in detail hereinbelow.

As shown in FIG. 3, an optical transceiver 10 includes a positive voltage power supply 300, a step-up transforming circuit 400, and a step-down transforming circuit 500, which serve as driver parts. The positive voltage power supply 300 generates a current with the intermediate electric-potential (first positive voltage). The step-up transforming circuit 400 steps up the intermediate electric-potential (first positive voltage) supplied from the positive voltage power supply 300, namely, increases the intermediate electric-potential to obtain a high voltage, thereby generating the LD current (second positive voltage). The step-down transforming circuit 500 steps down the intermediate electric-potential (first positive voltage) supplied from the positive voltage power supply 300, namely, reduces the intermediate electric-potential to obtain a low voltage, thereby generating a modulation current (modulation signal, third positive voltage).

As shown in FIG. 4, the optical transceiver 10 includes the electro-absorption modulated laser (EML) 100 shown in FIG. 1. As described above, all the driving currents for the EML 100 are supplied from the common positive voltage power supply 300. The optical transceiver 10 further includes an optical receiver 200. The EML 100 converts a transmitted electric signal into an optical signal to transmit it. The optical receiver 200 converts an optical signal, which has been transmitted, into an electric signal to receive it. As described above, the optical transceiver 10 incorporates therein all of the positive voltage power supply 300, the step-up transforming circuit 400, and the step-down transforming circuit 500. However, part or all of the positive voltage power supply 300, the step-up transforming circuit 400, and the step-down transforming circuit 500 may be provided outside the optical transceiver 10. For example, the step-up transforming circuit 400 and the step-down transforming circuit 500 may be installed in the optical transceiver 10 and the positive voltage power supply 300 may be provided outside the optical transceiver 10.

Next, operation of the optical transceiver according to the exemplary aspect of the present invention will be described in detail hereinbelow. As described above, the LD element is driven by supplying the LD current from the anode to the cathode being the intermediate electric-potential. The LD current is obtained by stepping up the intermediate electric-potential supplied from the positive voltage power supply 300 by the step-up transforming circuit 400. On the other hand, the modulation element is driven by supplying the modulation current (modulation signal) from the cathode being the intermediate electric-potential to the anode, namely, by applying the backward bias to the anode. The backward bias is obtained by stepping down the intermediate electric-potential supplied from the positive voltage power supply 300 by the step-down transforming circuit 500. Therefore, the respective voltages are adjusted so as to hold the relationship expressed by the expression (1).

The optical transceiver 10 further includes the driver IC 105. The driver IC 105 amplifies an inputted electric signal based on optical absorption characteristics of the electro-absorption optical modulator to apply a suitable operating voltage to the EML 100. In this case, based on the expression (1), the optical absorptance of the modulation element increases as a potential difference between the cathode (intermediate electric-potential side) and the anode (backward bias side) becomes larger. In other words, a backward bias current applied to the modulation element is controlled based on the electric signal inputted to the driver IC 105, thereby controlling the ON/OFF output of the optical signal. With the mechanism, the electric signal is converted into the optical signal.

In a conventional structure, the intermediate electric potential is in a ground level. Accordingly, in order to realize the backward bias to the EML, it is necessary to apply, to the EML, a negative voltage relative to the intermediate electric-potential, which is in the ground level. That is, it is necessary to supply the LD current flowing into the LD element from the positive voltage side to the intermediate electric-potential side which is in the ground level and to supply the backward bias current flowing into the modulation element from the negative voltage side to the intermediate electric-potential side which is in the ground level.

In contrast to this, according to this exemplary aspect, all the driving voltages to be applied to the EML are set as the positive voltages, and are set so as to satisfy the relationship expressed by the expression (1). As a result, the preferable operation is possible in this exemplary aspect.

As described above, according to the optical transceiver 10 in this exemplary aspect, the voltage from the single positive voltage power supply 300 can be adjusted by the step-up transforming circuit 400 and the step-down transforming circuit 500 to generate the first positive voltage, the second positive voltage, and the third positive voltage which satisfy the expression (1). Therefore, the EML 100 can be driven at the positive voltages and the EML 100 can be operated using the single power supply. Further, it is unnecessary to prepare different kinds of power supplies. In addition, it is unnecessary to draw power supply wirings for negative voltage power supply and to use parts for negative voltage power supply. Because the power supplies are unified, this exemplary aspect has an effect of enhancing the general versatility in the case where the optical transmitter is installed in an apparatus or in use environments.

It should be noted that, as shown in FIG. 4, the optical transceiver 10 further includes a read only memory (ROM) 600 and a central processing unit (CPU) 700. The ROM 600 serving as a recording medium stores programs for driving the optical transceiver 10. The CPU 700 reads necessary programs from the ROM and controls each component of the optical transceiver 10 based on the programs.

The optical transceiver according to the exemplary aspect of the present invention has the following effect. As described above, all the driving voltages to be applied to the EML 100 are set as the positive voltages, and are set so as to satisfy the relationship expressed by the expression (1). Therefore, all the voltages for driving the EML 100 can be supplied from the positive voltage power supply. Thus the negative voltage power supply is unnecessary, so the power supply noise generated from the negative voltage power supply can be eliminated, and the characteristics of the optical transceiver can be enhanced. In addition, it is unnecessary to draw power supply wirings for the negative voltage power supply and to use parts for the negative voltage power supply, which are conventionally used. In this exemplary aspect, the power supply may be commonly used to reduce the necessary number of power supplies, with the result that the general versatility is improved. When the optical transceiver is installed in an apparatus, no circuit for the negative voltage power supply is required, so the optical transceiver can be driven by only the positive power supply whose versatility is high. Accordingly, this exemplary aspect has an effect capable of negating the need for a negative voltage power supply and thereby improving the general versatility in the case where the optical transmitter is installed in the apparatus or in use environments.

The above-mentioned exemplary aspect is a preferred exemplary aspect of the present invention, and thus various modifications can be made without departing from the gist of the present invention.

Figure 5:
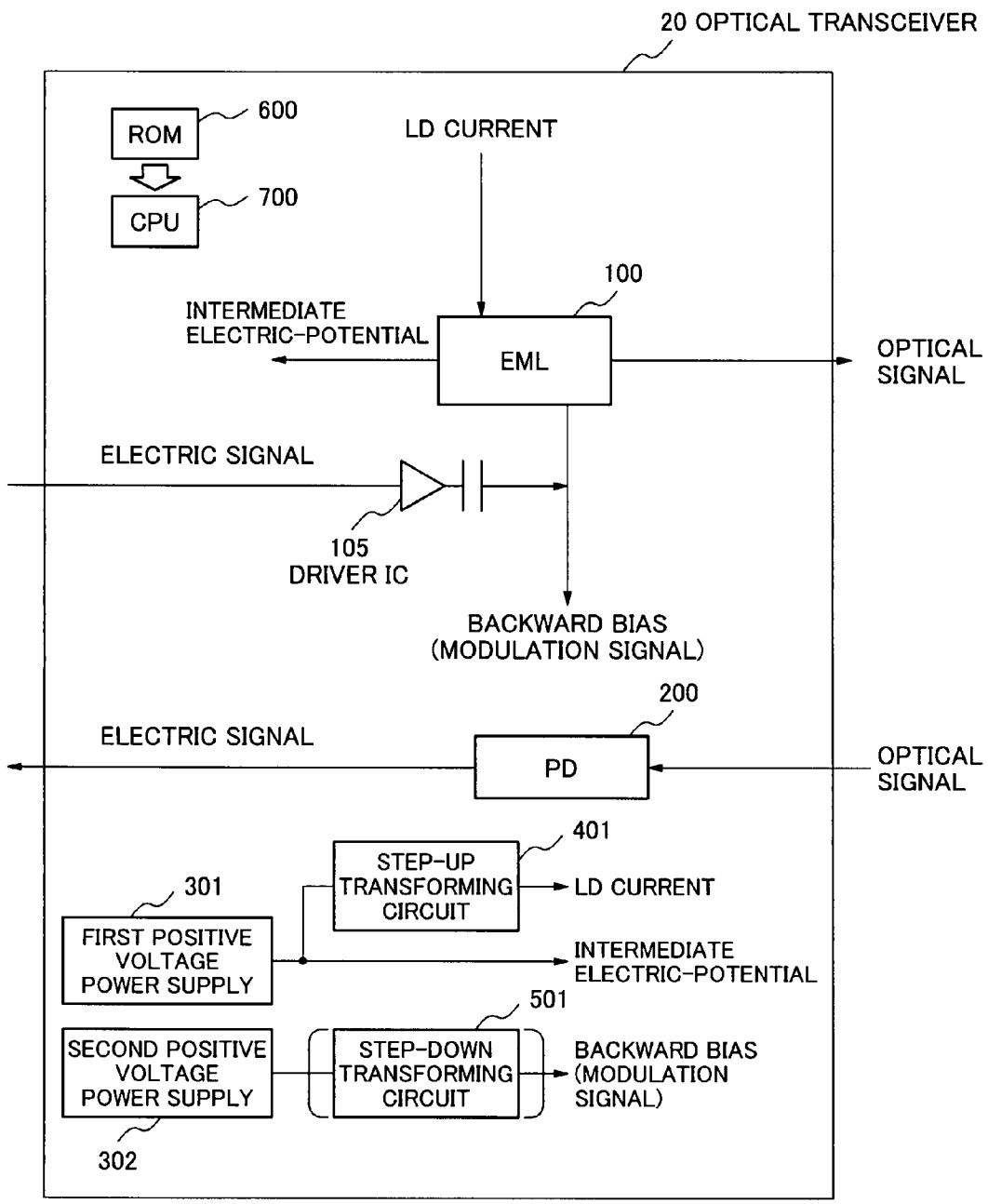
FIG. 5 is another structural diagram illustrating the optical transceiver according to the exemplary aspect of the present invention.

For example, in the above-mentioned exemplary aspect, the power supply is commonly used for all the components. However, partial common use maybe employed. As a modified example, FIG. 5 is another structural diagram illustrating the optical transceiver according to the exemplary aspect of the present invention. An optical transceiver 20 includes two kinds of positive voltage power supplies. A first positive voltage power supply 301 generates a voltage of 5V, and a second positive voltage power supply 302 generates a voltage of 3.3V (each of the voltages is standard voltage). The respective voltages are classified hereinbelow.

First positive voltage (intermediate electric-potential) . . . 5 V (first standard voltage)

Second positive voltage (potential for LD current) . . . voltage generated from first positive voltage by step-up a transforming circuit 401

Third positive voltage (potential for backward bias) . . . 3.3 V (second standard voltage)

That is, the third positive voltage can be supplied by using the second standard voltage (3.3 V) from another positive voltage power supply (302). It should be noted that, a voltage value obtained by reducing the second standard voltage (3.3 V) by a step-down transforming circuit 501 may be generated as the third positive voltage. Even when a regulator is used as the step-down transforming circuit 501, a loss caused by voltage drop can be suppressed. This is because a voltage-drop loss caused when the second standard voltage of 3.3 V is reduced to a desirable value is smaller than a voltage-drop loss caused when the first standard voltage of 5 V is reduced to the desirable value.

Even in such a case, an effect capable of eliminating the negative voltage power supply is obtained. As a possible, it is possible to suppress the generation of power supply noise and deterioration in characteristic of the optical transceiver, which are caused by the negative voltage power supply. It is unnecessary to draw power supply wirings for the negative voltage power supply. Parts for the negative voltage power supply can be eliminated. When the optical transceiver is installed in an apparatus, no circuit for the negative voltage power supply is required, so the optical transceiver can be driven by only the positive power supply whose versatility is high. Thus, this modified example also has an effect capable of negating the need for a negative voltage power supply and thereby improving the general versatility in the case where the optical transmitter is installed in the apparatus or in use environments.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended during prosecution.

What is claimed is:

1. An optical transmitter with an external modulator comprising:
   a light-emitting unit emitting a continuous wave light;
   a modulation unit modulating the continuous wave light in accordance with an electric signal;
   a first terminal applying a first positive voltage to a cathode of the light-emitting unit and a cathode of the modulation unit;
   a second terminal applying a second positive voltage of a constant value to an anode of the light-emitting unit; and
   a third terminal applying a third positive voltage with the electric signal to an anode of the modulation unit,
   wherein:
   the second positive voltage is set to a value higher than the first positive voltage; and
   the third positive voltage is set to a value lower than the first positive voltage.

2. An optical transmitter with an external modulator according to claim 1, wherein:
   the modulation unit modulates an output of the continuous wave light based on electro-absorption.

3. An optical transmitter with an external modulator according to claim 1, wherein:
   the light-emitting unit and the modulation unit are integrated into one.

4. An optical transmitter with an external modulator according to claim 1, wherein:
   the second positive voltage is applied to the anode of the light-emitting unit in forward bias and the third positive voltage is applied to the anode of the modulation unit in backward bias.

5. An optical transceiver, comprising:
   the optical transmitter with the external modulator according to claim 1; and
   a positive voltage power supply applying the first positive voltage to the optical transmitter with the external modulator,
   wherein:
   the power supply applies the first positive voltage to the cathode of the light-emitting unit and the cathode of the modulation unit through the first terminal.

6. An optical transceiver according to claim 5, further comprising:
   a step-up transforming circuit increasing the first positive voltage supplied from the power supply to generate the second positive voltage and applying the second positive voltage to the anode of the light-emitting unit through the second terminal.

7. An optical transceiver according to claim 5, further comprising:
   a step-down transforming circuit reducing the first positive voltage supplied from the power supply to generate the third positive voltage and applying the third positive voltage to the anode of the modulation unit through the third terminal.

8. An optical transceiver according to claim 5, further comprising:
an optical receiver receiving an optical signal and converting the optical signal into an electric signal.

9. An optical transceiver according to claim 5, further comprising:
a microprocessor controlling the optical transmitter with the external modulator.

10. An optical transceiver according to claim 5, further comprising:
a driving circuit driving the optical transmitter with the external modulator;
a power supply circuit applying a voltage to the optical transmitter with the external modulator; and
a temperature adjusting circuit adjusting a temperature of the optical transmitter with the external modulator.

11. A method of driving an optical transmitter with an external modulator comprising a light-emitting unit and a modulation unit, comprising:
applying a first positive voltage to a cathode of the light-emitting unit and a cathode of the modulation unit;
applying a second positive voltage of a constant value to an anode of the light-emitting unit;,
emitting continuous wave light from the light-emitting unit;
applying a third positive voltage with an electric signal to an anode of the modulation unit; and
modulating the continuous wave light in accordance with the electric signal by the modulation unit,
wherein:
the second positive voltage is set to a value higher than the first positive voltage, and
the third positive voltage is set to a value lower than the first positive voltage.

12. A method according to claim 11, wherein
the continuous wave light is modulated based on electro-absorption.

13. A method according to claim 11, wherein
the second positive voltage is applied to the anode of the light-emitting unit in forward bias and the third positive voltage is applied to the anode of the modulation unit in backward bias.

14. A method according to claim 11, further comprising:
increasing the first positive voltage to generate the second positive voltage; and
applying the second positive voltage to the anode of the light-emitting unit.

15. A method according to claim 11, further comprising:
reducing the first positive voltage to generate the third positive voltage; and
applying the third positive voltage to the anode of the modulation unit.

* * * * *